3,075,824
MANGANESE PENTACARBONYL HYDRIDE AND A PROCESS FOR ITS PREPARATION Walter Hieber and Gerhard Wagner, both of Munich, Germany, assignors to Badische Anilin- & Soda-Fabrik Aktiengesellschaft, Ludwigshafen (Rhine), Germany
No Drawing. Filed June 18, 1958, Ser. No. 742,733
Claims priority, application Germany Dec. 20, 1957
3 Claims. (Cl. 23—14)

This invention relates to the production of manganese pentacarbonyl hydride, $Mn(CO)_5.H$, a compound which has hitherto not been known.

We have found that manganese pentacarbonyl hydride can be prepared in a simple way by reacting manganese pentacarbonyl, $(Mn(CO)_5)_2$, with the aid of a base reaction solution to form pentacarbonyl manganate and treating this compound with an acid. The reaction occurs at room temperature, but also higher temperatures as e.g. 50° C., 70° C. and 100° C. may be employed.

The manganese pentacarbonyl hydride formed by the treatment of pentacarbonyl manganate, for example $(Mn(CO)_5)Na$, with an acid melts at −23° C. and at room temperature is an easily mobile colorless liquid. Below its melting point it may be sublimed in vacuo. Contrasted with the carbonyl hydrides of iron and cobalt it is distinguished by considerable stability.

A suitable base reaction solution for preparing pentacarbonyl manganate from manganese pentacarbonyl is e.g. alcoholic lye. Suitable hydroxides for preparing an alcoholic lye are the hydroxides of sodium, potassium, lithium, rubidium and caesium, in some cases also the hydroxides of the alkaline earth metals as e.g. calcium or barium. These hydroxides are dissolved in alcohols, as for instance in methanol or in higher alcohols as ethanol, propanol and so on. Methanolic alkali hydroxide has proved advantageous. Methanolic barium hydroxide is also suitable, the corresponding barium salt being obtained.

As acids for reaction with the pentacarbonyl manganate there may be used inorganic or organic non-oxidizing acids, acid salts or other acid media.

The acid may be added directly to the pentacarbonyl manganate dissolved in the base reaction solution. It is also possible to work, however, by isolating the said salt by evaporating the solvent. In many cases it has proved advantageous to treat the dissolved pentacarbonyl manganate with large-volumed cations, for example tri-orthophenanthroline nickel(II) salts or stable cation complexes, such as $(Cr(C_6H_6)_2)^+$, or $(Co(C_5H_5)_2)^+$, to react with acid the complex thereby precipitated and then separated, and to remove the manganese pentacarbonyl hydride thus formed.

Manganese pentacarbonyl hydride prepared according to the present invention is suitable as raw material for the production of valuable antiknock agents especially of cyclopentadienyl-manganese tricarbonyl. Furthermore manganese pentacarbonyl hydride is easily to be converted in esters, e.g. with diazomethane, according to the formula:

$$Mn(CO)_5H + CH_2N_2 \rightarrow Mn(CO)_5.CH_3 + N_2$$

These esters may be employed as catalysts for organic syntheses.

The following examples will further illustrate this invention but the invention is not restricted to these examples.

Example 1

10 grams of manganese pentacarbonyl are treated with 100 ml. of 2-normal sodium hydroxide solution obtained by dissolving sodium hydroxide in pure methanol. After the reaction is finished the solution which contains the sodium pentacarbonyl manganate is diluted with 200 ml. of water in the absence of nitrogen and treated with concentrated phosphoric acid. The manganese pentacarbonyl hydride is set free and condensed with liquid nitrogen in a receiver under high vacuo.

Example 2

16 grams of manganese pentacarbonyl are reacted with 100 ml. of 3-normal potassium hydroxide solution obtained by dissolving potassium hydroxide in methanol (Merck pro analysis). With good stirring the reaction is ended in half an hour at room temperature.

400 ml. of 0.1 molar aqueous tri-ortho-phenanthroline nickel(II) chloride are added to the filtered solution. The complex $(Ni(C_{12}H_8N_2)_3).(Mn(CO)_5)_2$ is thus precipitated at once; after filtering off, the manganese pentacarbonyl hydride is recovered with 2-normal hydrochloric acid in a receiver according to Example 1.

Instead of tri-ortho-phenanthroline nickel(II) chloride there may also be used other large-volumed stable cation complexes, such as $(Cr(C_6H_6)_2)^+$ or $(Co(C_5H_5)_2)^+$ and the like.

We claim:

1. A process for the production of manganese pentacarbonyl hydride having the formula $Mn(CO)_5.H$ which comprises reacting manganese pentacarbonyl with an alcoholic solution of a compound selected from the group consisting of alkali metal and alkaline earth metal hydroxides to form a pentacarbonyl manganate salt, precipitating a complex salt of pentacarbonyl manganate from said alcoholic solution by the addition of tri-orthophenanthroline nickel(II), and reacting said complex salt with a non-oxidizing acid to obtain said manganese pentacarbonyl hydride.

2. A process for the production of manganese pentacarbonyl hydride having the formula $Mn(CO)_5.H$ which comprises reacting manganese pentacarbonyl with an alcoholic solution of a compound selected from the group consisting of alkali metal and alkaline earth metal hydroxides to form a pentacarbonyl manganate salt, precipitating a complex salt of pentacarbonyl manganate from said alcoholic solution by the addition of $[Cr(C_6H_6)_2]^+$, and reacting said complex salt with a non-oxidizing acid to obtain said manganese pentacarbonyl hydride.

3. A process for the production of manganese pentacarbonyl hydride having the formula $Mn(CO)_5.H$ which comprises reacting manganese pentacarbonyl with an alcoholic solution of a compound selected from the group consisting of alkali metal and alkaline earth metal hydroxides to form a pentacarbonyl manganate salt, precipitating a complex salt of pentacarbonyl manganate from said alcoholic solution by the addition of $[Co(C_5H_5)_2]^+$, and reacting said complex salt with a non-oxidizing acid to obtain said manganese pentacarbonyl hydride.

References Cited in the file of this patent

D. Hurd et al.: "Journal of the American Chemical Society," vol. 71, May 1949, page 1899.

E. O. Brimm et al.: "Journal of the American Chemical Society," vol. 76, July 1954, pages 3831–35.

R. D. Closson et al.: "Journal of Organic Chemistry," vol. 22, May 1957, page 598.